Dec. 21, 1965   W. A. WHITMIRE   3,224,597
LOAD DISTRIBUTION SYSTEM FOR TRACTOR-TRAILER VEHICLES
Filed Dec. 19, 1963   2 Sheets-Sheet 2

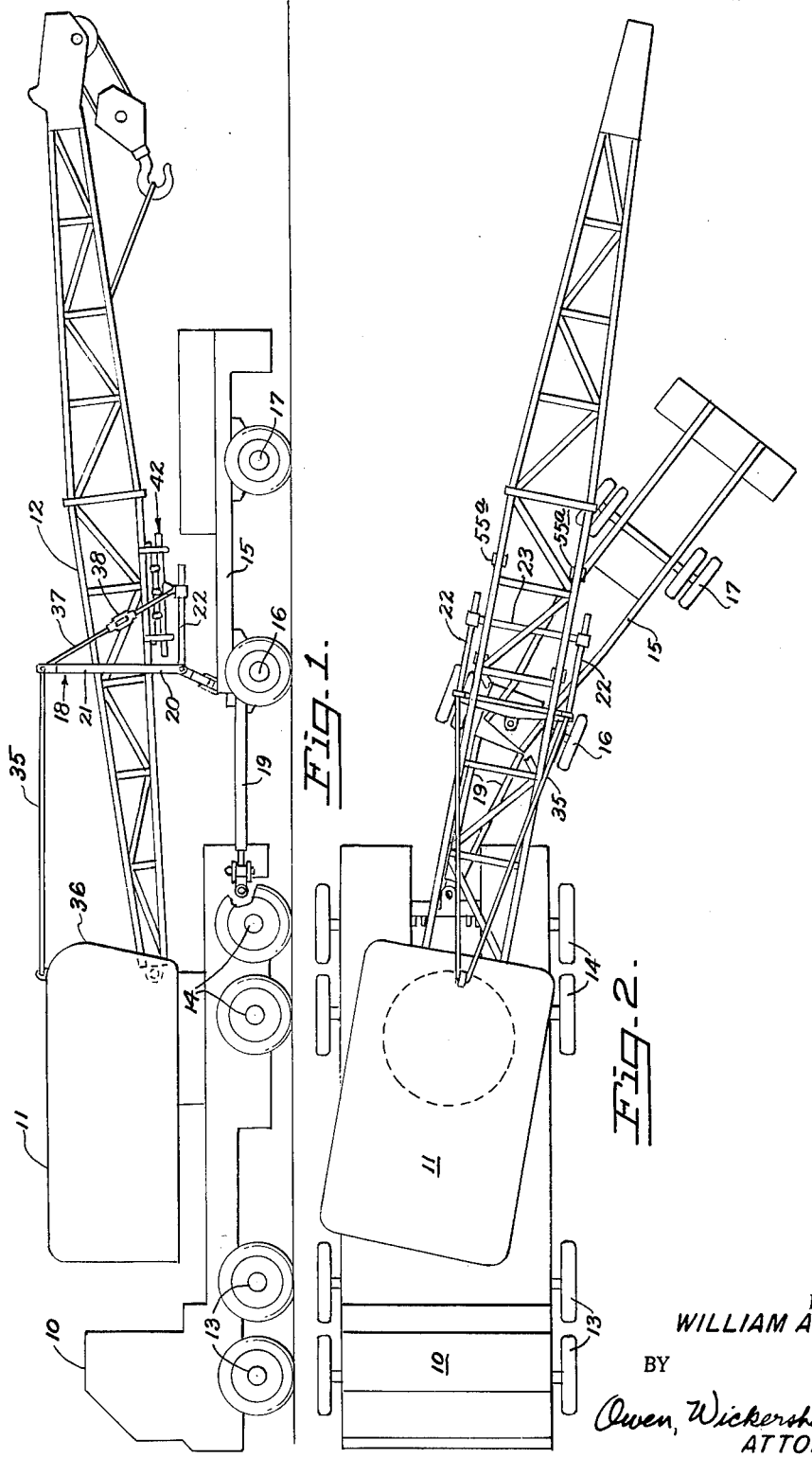

INVENTOR.
WILLIAM A. WHITMIRE
BY
Owen, Wickersham & Erickson
ATTORNEYS

United States Patent Office 3,224,597
Patented Dec. 21, 1965

3,224,597
LOAD DISTRIBUTION SYSTEM FOR TRACTOR-TRAILER VEHICLES
William A. Whitmire, Castro Valley, Calif., assignor to Bigge Drayage Co., San Leandro, Calif., a corporation of California
Filed Dec. 19, 1963, Ser. No. 331,812
8 Claims. (Cl. 212—59)

This invention relates to highway type vehicles for transporting extremely large and heavy loads, and more particularly, it relates to a tractor-trailer vehicle for transporting a crane or shovel having an extended boom-like member.

A major problem in transporting heavy loads on vehicles over public highways is in distributing the load over a number of the vehicle wheels so that no one axle becomes overloaded and exceeds the allowable limit provided by highway regulations. This problem becomes particularly difficult when it is necessary to accommodate large pieces of equipment that tend to concentrate a large amount of weight in a relatively small area and which also have heavy members extending therefrom.

A principal object of the present invention is to provide a tractor-trailer highway train vehicle for carrying a heavy piece of construction equipment having a heavy, elongated member extending therefrom such as a crane with a boom so that the load on the various sets of wheels of the carrying vehicle is equally distributed.

More specifically, an object of the invention is to provide a device in combination with a tractor and a trailer attached thereto for guiding and supporting the boom of a crane mounted on the tractor vehicle and for utilizing the weight of the boom to effect the transfer of some of the load that would normally be on the tractor axles to the axles of the trailer, thereby causing the load of the crane and its boom to be distributed substantially evenly over the tractor and trailer axles.

Another object of the present invention is to provide a highway type tractor-trailer vehicle for transporting a large crane having along heavy boom with means for supporting the boom in such a manner that it will always remain stable and well supported, will move relative to the trailer when necessary, and will maintain a substantially even distribution of weight on all the vehicle axles despite the normal maneuvering or turning of the tractor relative to the trailer.

The aforesaid and other objects of the invention are accomplished by a unique combination of elements including a cradle assembly on the trailer that supports the boom when it is in the down position extending horizontally from the crane the tractor vehicle. The cradle assembly is mounted with three degrees of freedom of movement and is rotatable about a horizontal axis. Attached to a pair of upright arms are cables that extend to the crane on the trailer. The weight of the boom is applied near the outer ends of a pair of horizontal arms on the cradle assembly, causing a proportionate amount of tension in the aforesaid cables. As will be apparent from the following description, this tension produced in the cables causes a shifting of the weight of the crane from the tractor vehicle to the trailer vehicle, the result being a substantial equalization of all the axle loads.

Other objects, advantages and features of the invention will become apparent from the following detailed description of one embodiment thereof presented in accordance with 35 USC 112.

In the drawings:

FIG. 1 is a view in elevation showing a tractor-trailer vehicle embodying the principles of the invention;

FIG. 2 is a plan view of the vehicle shown in FIG. 1 as it appears when in a turn;

Figure 3:
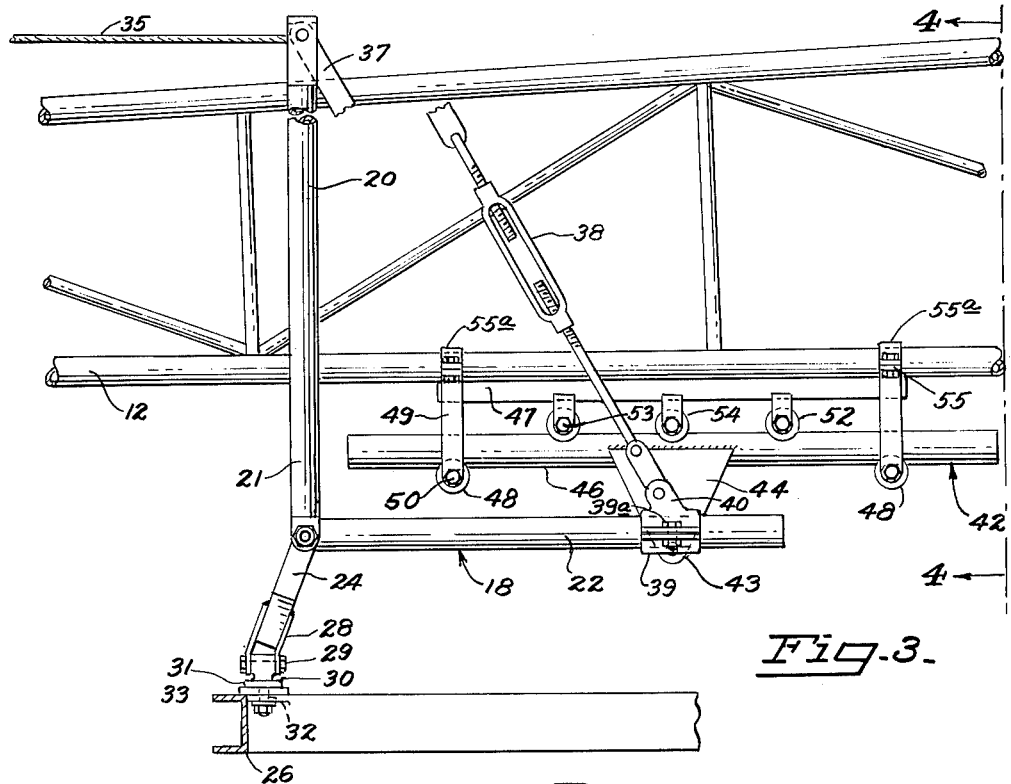
FIG. 3 is an enlarged fragmentary view in elevation showing the cradle assembly from the crane boom in greater detail, a portion of the upright arms of the cradle assembly have been broken away to conserve space.

In the drawings, FIGS. 1 and 2 show a tractor vehicle 10 on which is mounted a typical construction crane 11 equipped with a long heavy boom 12. The tractor 10 having a pair of axles 13 and 14 is connected to a trailer 15 having a pair of axles 16 and 17 and mounted thereon is a unique movable cradle 18 for supporting the boom 12 when the crane 11 is being transported from one location to another. As will be seen from the following description of the invention, the cradle 18 is constructed and mounted in such a manner on the trailer that, in supporting the heavy boom 12, is causes a shifting of weight from the two axles 13 and 14 of the tractor to the front and rear axles 16 and 17 of the trailer.

In the arrangement shown, the main body of the crane 11 excluding its boom is mounted directly on the tractor vehicle 10, but it could have tracks and be removably mounted thereon if suitably blocked or tied down to prevent it from moving. The trailer 15 is attached to the tractor 10 by a tongue or reach 19 that is connected to the front steerable axle 16 on the trailer. Other forms of trailers and other types of connections to the tractor vehicle other than the one shown could be used within the scope of the invention. The principal requirement is that the connecting reach be rigid so that it can transmit a force from the trailer to the tractor when the boom is supported in the cradle 18.

Figure 4:
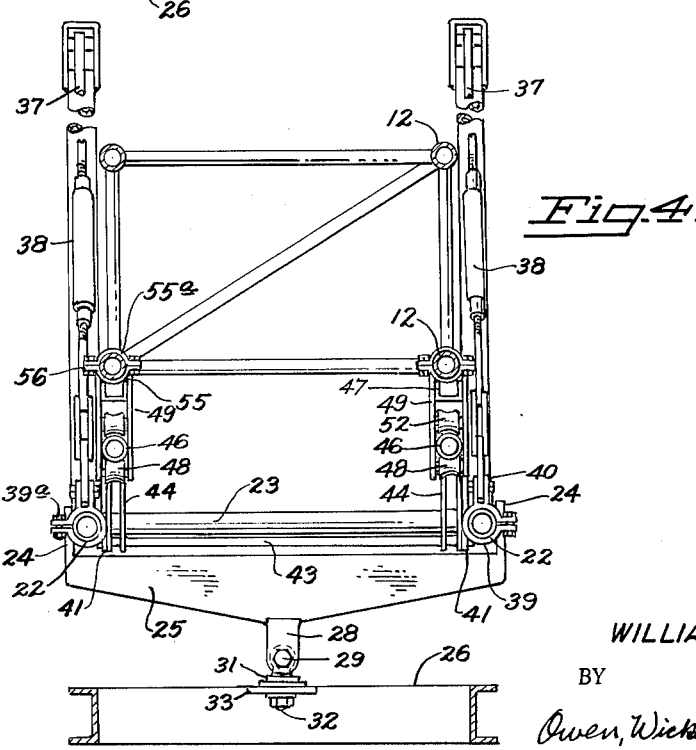
FIG. 4 is a view in end elevation and in section taken along the line 4—4 of FIG. 3.

The cradle 18 is shaped generally like a bell crank and comprises a pair of spaced apart L-shaped frame members 20 between which the crane boom is supported when it is stowed. Each frame member 20 has an upright leg 21 connected at its lower end and at a right angle to a horizontal leg 22, the two members 20 being rigidly connected by a cross bar 23 at the junctions of the legs 21 and 22. As shown in FIG. 4, the ends of the cross bar 23 and hence the cradle members 20 are suported in a pair of bearing brackets 24 that are fixed to the ends of a bolster 25. The bolster 25 is pivotally mounted on a forward end frame portion 26 of the trailer 15. At the center of the bolster 25 are fixed a pair of spaced apart bearing brackets 28 which are bent near their ends so that the bolster is inclined slightly rearwardly on the trailer (FIG. 3). Supported by a pin 29 between the bearing brackets 28 is a bearing block 30 having a circular flange 31 at its lower end and a cylindrical concentric pin 32 extending vertically below the flange 31. The pin 32 from the bearing block 30 extends downwardly through a hole in a mounting plate 33 which is provided for added strength and rigidly fixed to the trailer frame 26. The pin 32 and the bearing block 30, and thus the entire bolster 25 are rotatable horizontally on the frame 26. Also the bolster and its cradle assembly 18 are pivotal laterally or rotatable abount the pin 29 which is parallel to the longitudinal axis of the boom 12. Thus, since the cross bar 23 is pivotal within its supporting brackets 24, the cradle 18 has three degrees of freedom of movement on the trailer 15.

At the upper ends of the upright legs 21 of the cradle 18 are attached cables 35 which extend forward and are fixed to rigid mounts on the crane cab 36, prefeably near its uppermost portion. The cables 35 are of such a length that they will be placed in tension when the leg members 21 are substantially upright and the boom 12 is resting within and is supported by the cradle 18 in the stowed position. Additional structural support is provided between the upright legs 21 and the horizontal legs 22 by a pair of adjustable strap members 37 connected near the ends of the legs.

Mounted on each horizontal leg 22 near its outer end is a sleeve-like fitting 39 having an upwardly extending portion 40 which is pivotally attached to the lower end of a strap member 37. Each fitting 39 is split along one side and has lug portions extending outwardly which are connected by a bolt 39a. This bolt when tightened will secure the fitting firmly to the leg 22, and thus the fittings can be moved to any position along the arms 23. This adjustment feature, as will be seen, enables the fulcrum point of the boom to be changed on the cradle 18 when necessary to alter the load ratio of the tractor-trailer train. The strap members 37 are provided with turnbuckles 38 between their ends so that their length can also be adjusted when the sleeve-like fittings 39 are relocated in the aforesaid manner.

On the inside of each sleeve-like fitting 39 is a downwardly extending arm portion that forms a bearing bracket 41 for an auxiliary cradle member 42. Extending between and supported by the bearing bracket 41 is a cross bar 43 to which is pivotally mounted the auxiliary cradle member 42.

The auxiliary cradle member 42 comprises a pair of triangular shaped bearing bracket members 44 having bores at their lower ends that are horizontally aligned and through which the cross bar 43 extends. Fixed to the upper ends of the triangular members 44 are a pair of parallel spaced apart cylindrical members 46 that serve as guide rails. Movably mounted on each of the parallel rail members 46 is a longitudinally movable attaching member 47 which enables the crane boom 12 to be fixed to the cradle assembly 18. These latter members 47 are preferably upright channel members to which are attached a series of concave rollers that retain the channel member on the guide rail while enabling it to move parallel to it. As shown in FIG. 3, a roller 48 is provided at each end which is supported on a relatively long bracket member 49 extending downwardly from the sides of the channel 47. Each bracket member 49 supports a pin 50 that retains the roller 48 underneath the guide rails 46. Between the end rollers 48 are a plurality of similar concave rollers 52 rotatably supported on pins 53 fixed to shorter support brackets 54 that extend down from the sides of the channel members 47 so that the rollers 52 can roll along the top of the guide rail 46. Fixed within each channel member 47 near its opposite ends are a pair of concave clamp members 55 with radially extending lugs 56. These clamp members 55 are adapted to fit partially around and to be connected in combination with similar clamp members 55a around longitudinal members of the boom and when tightened by bolts through the lugs 56 they serve to retain the boom 12 firmly on the member 47.

When the boom 12 is lowered into the stowed position and is attached to the channel members 47 by the clamps 55, the channel members can adjust themselves to the proper position longitudinally on the guide rails 46. Also, as the crane 11 is being transported, any relative movement by the tractor and trailer vehicles can be readily accommodated by the longitudinal freedom of movement afforded by the rollers 48 and 52 on the guide rails 46. For example, as the tractor-trailer vericle turns, the crane boom must adjust its position longitudinally on the cradle with respect to the trailer since the latter does not pivot on the tractor at the same location as the crane boom. The present invention makes this longitudinal adjustment possible while maintaining the load shifting feature that balances the weight on the tractor and trailer axles.

Thus, despite the three degrees of freedom of the cradle 18 that accommodate any change in position of the boom 12 as the tractor-trailer is turned, the effective engagement of the boom on the cradle assembly 18 is always near the outer ends of the horizontal leg members 22. This downwardly directed force causes the bell crank shaped cradle frame members 20 to rotate about a horizontal transverse axis on the trailer within the brackets 24 on the bolster 25 thereby causing an increase in tension in the cables 35 of the upper end of the upright members 21. This tension of the cables 35 in turn results in a compression force of the trailer tongue 19 on the tractor 10. The force couple comprised of the tension force in the cables 35 and the compression force in the tongue 19 causes a force moment that lightens the load on the front axle 13 of the tractor 10 and applies increased weight on its rear axle 14. However, this increase in weight of the rear axle 14 of the tractor 10 is in turn decreased because of the lever action produced by the boom 12 when it is supported by the cradle assembly 18 at the point of engagement thereon near the outer end of its horizontal leg members 22. Since this contact point on the cradle assembly is closer to the crane than the center of gravity of the boom, it forms a fulcrum for the boom. Thus, the weight of the boom causes it to act as a first class lever creating a resultant upward force at the point where the boom is connected to the crane. The overall effect of the system is therefore to shift the weight of the crane and its boom 12 from the tractor 10 to the trailer vehicle 15 so that the total load is substantially equally distributed on the axles of the tractor and trailer vehicles. As mentioned previously, the fittings 39 are adjustable longitudinally on the cradle 18 when it is desired to change the fulcrum point of the boom 11 and thus the load ratio effect on the tractor and trailer.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A highway tractor train for carrying a crane with with an attached boom so that the entire weight load thereof is distributed substantially equally amongst the wheels of the train comprising:
 a lead tractor with front and rear wheels and a crane body rotatably mounted thereon, said crane body having a boom pivotally attached thereto and extending rearwardly;
 a train end trailer having wheels near its front and rear ends;
 a tongue pivotally connecting the front end of said trailer with the rear end of said tractor;
 a cradle means pivotally mounted on said trailer;
 said cradle means having a rearwardly extending portion for pivotally supporting the boom of said crane between the center of gravity of said boom and the crane body on said lead tractor;
 said cradle means having an upright portion fixed to said rearwardly extending portion;
 means near the upper end of said upright portion connecting said cradle means to said crane body;
 and means near the outer end of said rearwardly extending cradle portion for engaging the crane boom when it is lowered into the cradle;
 whereby the weight of the boom causes a tension load in the means connecting the upright portion of the cradle means to the crane and also a compression load in said tongue, said cradle means also serving as a fulcrum for said boom causing it to transmit an upload on the crane body, thereby distributing evenly the weight load on the wheels of the tractor and trailer vehicles.

2. In combination with a highway tractor train including a lead tractor with front and rear wheels and a crane body mounted thereon with a pivotally attached rearwardly extending boom, a train end trailer having wheels near its front and rear ends, a tongue pivotally connecting the front end of said trailer with the rear end of said tractor, a boom support means pivotally mounted on said trailer and having a portion extending rearwardly from a transverse pivotal axis for engaging the boom of said crane between the boom's center of gravity and said crane body on said lead tractor;

said boom support means having an upright portion fixed to said rearwardly extending portion;

cable means near the upper end of said upright portion connecting said boom support means to the crane body;

whereby the weight of the boom exerted on said rearwardly extending portion of said support means causes a tension load in the cable means connecting the upright portion of the support means to the crane and also a compression load in said tongue, said support means also serving as a fulcrum for said boom and causing it to transmit an upload on the crane, the total result being a substantially even distribution of weight on the wheels of the tractor and trailer vehicles.

3. In combination with a crane having a main body and heavy boom-like member pivotally attached thereto, a highway tractor train for carrying said crane and its attached boom member so that the entire weight load thereof is distributed amongst the wheels of the train, comprising:

a lead tractor having front and rear wheels with the crane body mounted thereon;

a train end trailer having wheels near its front and rear ends;

a rigid tongue pivotally connecting the front end of said trailer with the rear end of said tractor;

cradle means pivotally mounted on said trailer near its forward end;

said cradle means having a rearwardly extending portion for engaging and supporting the boom of said crane between the boom center of gravity and said crane body supported on said lead tractor;

said cradle means having an upright portion rigidly fixed to said rearward extending portion and connected near its upper end to the crane body;

and means near the outer end of said rearwardly extending cradle portion for securing the boom thereto when it is lowered onto the cradle.

4. In combination with a crane having a main body and heavy boom-like member pivotally attached thereto, a highway tractor train for carrying said crane and its attached boom member so that the entire weight load thereof is distributed amongst the wheels of the train, comprising:

a lead tractor having front and rear wheels with the crane mounted thereon;

a train end trailer having wheels near its front and rear ends;

a rigid tongue pivotally connecting the front end of said trailer with the rear end of said tractor;

a cradle assembly pivotally mounted on said trailer near its forward end;

said cradle assembly having a rearwardly extending portion for engaging and supporting the boom of said crane between the boom center of gravity and said crane body supported on said lead tractor;

said cradle assembly having an upright portion fixed to said rearwardly extending portion and connected near its upper end to the crane body;

and means attached to but longitudinally movable on said rearwardly extending cradle portion for securing the boom thereto so that the effective weight of the boom is applied to the cradle assembly rearward of its pivotal connection on said trailer.

5. The device as described in claim 4 wherein said cradle assembly includes an auxiliary boom support assembly pivotally attached to the outer ends of its rearwardly extending portions and including means rigidly connected to the crane boom for allowing it to longitudinally move within limits as the tractor train is moving and turning, while substantially all of the weight of the crane remains concentrated at the outer ends of said rearwardly extending portions.

6. The device as described in claim 4 wherein said cradle assembly comprises:

a pair of interconnected spaced apart bell crank members having upright arm portions connected at their lower ends to rearwardly extending substantially horizontal arm portions;

an auxiliary support member including a pair of parallel spaced apart rails pivotally connected to the outer ends of said horizontal arm portions;

longitudinal members connected by rollers to said rails and movable thereon;

and means for rigidly connecting said longitudinal members to said boom;

whereby the crane boom is free to move longitudinally and vertically within limits as the tractor train is moving and turning while the weight of the crane remains substantially concentrated near the outer ends of the horizontal arm portions of the cradle assembly.

7. A highway tractor train for carrying a crane with an attached boom so that the entire weight load thereof is distributed substantially equally amongst the wheels of the train comprising;

a lead tractor with front and rear wheels and a crane body rotatably mounted thereon, said crane body having a boom pivotally attached thereto and extending rearwardly;

a train end trailer having wheels near its front and rear ends;

a tongue pivotally connecting the front end of said trailer with the rear end of said tractor;

a cradle means mounted on said trailer;

said cradle means having a rearwardly extending portion for pivotally supporting the boom of said crane between the center of gravity of said boom and the crane body on said lead tractor and an upright portion fixed to said rearwardly extending portion;

means near the upper end of said upright cradle portion connecting said cradle means to said crane body;

bolster means pivotally connected to said trailer for supporting said cradle means and rotatable about a vertical and a longitudinal axis, said cradle means being pivotally on said bolster means about a horizontal lateral axis;

and means near the outer end of said horizontal cradle portion for engaging the crane boom when it is lowered into the cradle;

whereby the weight of the boom causes a tension load in the means connecting the upright portion of the cradle means to the crane and also a compression load in said tongue, said cradle means also serving a fulcrum for said boom causing it to transmit an upload on the crane body, thereby distributing evenly the weight load on the wheels of the tractor and trailer vehicles.

8. A highway tractor train for carrying a crane with an attached boom so that the entire weight load thereof is distributed substantially equally amongst the wheels of the train comprising:

a lead tractor with front and rear wheels and a crane body rotatably mounted thereon, said crane body having a boom pivotally attached thereto and extending rearwardly;

a train end trailer having wheels near its front and rear ends;

a rigid tongue pivotally connecting the front end of said trailer with the rear end of said tractor;

a cradle means mounted on said trailer having a rearwardly extending horizontal portion for pivotally supporting the boom of said crane between the center of gravity of said boom and the crane body on said lead tractor, and an upright portion fixed to said rearwardly extending portion;

means universally connected to said trailer and pivotally supporting said cradle means at the junction of its rearwardly extending and upright portions;

cable means near the upper end of said upright portion connecting said cradle means to said crane body;

and means adjustably mounted on said horizontal cradle portion for engaging and securing the crane boom when it is lowered into the cradle so that the weight of the crane boom is exerted at a predetermined point on said cradle;

whereby the weight of the boom causes a tension load in said cable means connecting the upright portion of the cradle means to the crane and also a compression load in said tongue, said cradle means also serving as a fulcrum for said boom causing it to transmit an upload on the crane body, thereby distributing evenly the weight load on the wheels of the tractor and trailer vehicles.

References Cited by the Examiner

UNITED STATES PATENTS

| | | | |
|---|---|---|---|
| 2,649,211 | 8/1953 | Fero | 212—144 |
| 3,073,457 | 1/1963 | Thomas | 212—59 |

SAMUEL F. COLEMAN, *Primary Examiner.*